United States Patent
Song et al.

(10) Patent No.: US 8,918,063 B2
(45) Date of Patent: Dec. 23, 2014

(54) SYSTEM FOR TRANSMITTING/RECEIVING MULTI-BAND RADIO FREQUENCY SIGNAL USING DUAL INPUT, DUAL OUTPUT FILTER

(75) Inventors: In Sang Song, Yongin-si (KR); Duck Hwan Kim, Goyang-si (KR); Chul Soo Kim, Hwaseong-si (KR); Yun Kwon Park, Dongducheon-si (KR); Jea Shik Shin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1028 days.

(21) Appl. No.: 12/837,557

(22) Filed: Jul. 16, 2010

(65) Prior Publication Data
US 2011/0021162 A1    Jan. 27, 2011

(30) Foreign Application Priority Data

Jul. 16, 2009    (KR) .......................... 10-2009-0064882

(51) Int. Cl.
*H04B 1/44*    (2006.01)
*H04B 1/00*    (2006.01)
*H04B 1/52*    (2006.01)

(52) U.S. Cl.
CPC    *H04B 1/006* (2013.01); *H04B 1/52* (2013.01); *H04B 1/0053* (2013.01)
USPC ............................................ 455/83; 333/189

(58) Field of Classification Search
CPC ......... H04B 1/006; H04B 1/0053; H04B 1/52
USPC ............. 455/83, 78, 118, 323, 333, 304, 306
See application file for complete search history.

(56) References Cited

U.S. PATENT DOCUMENTS

| | | | |
|---|---|---|---|
| 5,021,756 A * | 6/1991 | Tajima et al. | 333/132 |
| 5,815,804 A * | 9/1998 | Newell et al. | 455/78 |
| 6,026,284 A * | 2/2000 | Seo | 455/115.1 |
| 6,466,613 B1 * | 10/2002 | Raphaeli et al. | 375/219 |
| 6,728,517 B2 * | 4/2004 | Sugar et al. | 455/73 |
| 6,751,470 B1 | 6/2004 | Ella et al. | |
| 6,803,835 B2 * | 10/2004 | Frank | 333/26 |
| 6,927,648 B2 * | 8/2005 | Furuya et al. | 333/132 |
| 7,155,178 B2 * | 12/2006 | Chang et al. | 455/101 |
| 7,194,247 B2 * | 3/2007 | Tikka et al. | 455/339 |
| 7,199,684 B2 | 4/2007 | Aigner et al. | |
| 7,256,663 B2 * | 8/2007 | Yasuda et al. | 333/26 |
| 7,269,441 B2 * | 9/2007 | Ella et al. | 455/553.1 |
| 7,463,864 B2 * | 12/2008 | Vassiliou et al. | 455/73 |
| 7,522,673 B2 * | 4/2009 | Giannakis et al. | 375/267 |
| 7,636,554 B2 * | 12/2009 | Sugar et al. | 455/73 |
| 7,768,792 B2 * | 8/2010 | Kim et al. | 361/760 |

(Continued)

FOREIGN PATENT DOCUMENTS

KR    10-2004-0079412    9/2004

*Primary Examiner* — Marceau Milord
(74) *Attorney, Agent, or Firm* — NSIP Law (57) ABSTRACT

A system for transmitting/receiving a multi-band Radio Frequency (RF) signal using a Dual Input, Dual Output filter is provided. The system may include a Single-Input Single-Output (SISO) filter and the Dual Input, Dual Output filter. The system for transmitting/receiving a multi-band Radio Frequency (RF) may be implemented in a Radio Frequency (RF) region, which includes an area from an end of an antenna to an end of a mixer in a mobile communication.

19 Claims, 8 Drawing Sheets

(56) References Cited

U.S. PATENT DOCUMENTS

| | | |
|---|---|---|
| 7,773,956 B2 * | 8/2010 | Fukamachi et al. ............ 455/78 |
| 7,907,958 B2 * | 3/2011 | Sampath et al. ............. 455/509 |
| 7,944,327 B2 * | 5/2011 | Kravchenko et al. ......... 333/185 |
| 7,982,533 B2 * | 7/2011 | Fan et al. ...................... 327/553 |
| 7,983,624 B2 * | 7/2011 | Knecht et al. .................. 455/73 |
| 8,036,148 B2 * | 10/2011 | Fukamachi et al. .......... 370/282 |
| 8,310,981 B2 * | 11/2012 | Damnjanovic et al. ....... 370/319 |
| 8,320,847 B2 * | 11/2012 | Weber et al. .................. 455/101 |
| 8,340,605 B2 * | 12/2012 | Hou et al. ................. 455/115.1 |
| 8,369,388 B2 * | 2/2013 | Hammerschmidt et al. .. 375/219 |
| 8,391,821 B2 * | 3/2013 | Okabe .......................... 455/323 |
| 8,442,572 B2 * | 5/2013 | Borran et al. ................. 455/522 |
| 8,582,547 B2 * | 11/2013 | Kemmochi et al. ........... 370/343 |
| 8,606,287 B2 * | 12/2013 | Landau et al. ............. 455/452.1 |
| 2003/0042992 A1 | 3/2003 | Frank |
| 2005/0068125 A1 | 3/2005 | Unterberger et al. |
| 2005/0107042 A1 * | 5/2005 | De Graauw .................... 455/78 |
| 2005/0245201 A1 | 11/2005 | Ella et al. |
| 2008/0272853 A1 | 11/2008 | Heinze et al. |
| 2009/0289721 A1 * | 11/2009 | Rajendran et al. ............ 330/301 |

* cited by examiner

SYSTEM FOR TRANSMITTING/RECEIVING MULTI-BAND RADIO FREQUENCY SIGNAL USING DUAL INPUT, DUAL OUTPUT FILTER

CROSS-REFERENCE TO RELATED APPLICATION(S)

This application claims the benefit under 35 U.S.C. §119 (a) of Korean Patent Application No. 10-2009-0064882, filed Jul. 16, 2009, in the Korean Intellectual Property Office, the entire disclosure of which is incorporated herein by reference for all purposes.

BACKGROUND

1. Field

The following description relates to a system for transmitting/receiving a multi-band radio frequency signal using a Dual Input, Dual Output filter.

2. Description of the Related Art

An analog Radio Frequency (RF) region refers to an area from an end of an antenna to an end of a mixer in a mobile communication. To use frequencies of various bands in an analog RF region, the number of passive components such as an antenna, a filter, a duplexer, a matching circuit, and the like may proportionally increase. That is, additional components may be necessary to use frequencies of various bands in an analog RF region. An increase in the number of passive components may result in a proportional increase in a requirement for an area and a characteristic of the passive components. Accordingly, a system for efficiently transmitting/receiving a multi-band RF signal is needed.

SUMMARY

In one general aspect, there is provided a transmitting/receiving system, including: a first filter unit including at least one Single-Input Single-Output (SISO) Band-Pass Filter (BPF), and a second filter unit including at least one Dual Input, Dual Output BPF.

The transmitting/receiving system may further include a phase shift unit including at least one Phase Shifter (PS). An end of the at least one PS may be connected to an end of the at least one SISO BPF included in the first filter unit.

The transmitting/receiving system may further include a switching unit configured to switch, when a plurality of PSs exists, the plurality of PSs, an end of the switching unit being connected to an end of an antenna. A number of SISO BPFs of the first filter unit, a number of Dual Input, Dual Output BPFs of the second filter unit, and a number of PSs may be equal to each other.

The transmitting/receiving system may further include a relay circuit unit including at least one component of a Low Noise Amplifier (LNA), a Power Amplifier (PA), and a balun. The relay circuit unit may connect the at least one SISO BPF included in the first filter unit to the at least one Dual Input, Dual Output BPF included in the second filter unit through the at least one component.

The transmitting/receiving system may further include a relay circuit unit including at least one set of a balun and an LNA, the balun having three ends, and the LNA having four ends. The relay circuit unit may connect the at least one SISO BPF included in the first filter unit to the at least one Dual Input, Dual Output BPF included in the second filter unit using the set of the balun and the LNA. An end of the balun may be connected to an end of the at least one SISO BPF included in the first filter unit, the other two ends of the balun may be connected to two ends of the LNA, and the other two ends of the LNA may be connected to two ends of the at least one Dual Input, Dual Output BPF included in the second filter unit.

The transmitting/receiving system may further include a relay circuit unit including at least one LNA having three ends. The relay circuit unit may connect the at least one SISO BPF included in the first filter unit to the at least one Dual Input, Dual Output BPF included in the second filter unit through the at least one LNA. An end of the at least one LNA may be connected to an end of the at least one SISO BPF included in the first filter unit, and the other two ends of the at least one LNA may be connected to two ends of the at least one Dual Input, Dual Output BPF included in the second filter unit.

The transmitting/receiving system may further include a relay circuit unit to include at least one PA having three ends. The relay circuit unit may connect the at least one SISO BPF included in the first filter unit to the at least one Dual Input, Dual Output BPF included in the second filter unit through the at least one PA. An end of the at least one PA may be connected to an end of the at least one SISO BPF included in the first filter unit, and the other two ends of the at least one PA may be connected to two ends of the at least one Dual Input, Dual Output BPF included in the second filter unit.

The transmitting/receiving system may further include a relay circuit unit including at least one set of an LNA and a PA, the LNA having three ends, and the PA having three ends. When a plurality of SISO BPFs is included in the first filter unit and a plurality of Dual Input, Dual Output BPFs is included in the second filter unit, the relay circuit unit may connect one of the SISO BPFs included in the first filter unit to one of the Dual Input, Dual Output BPFs included in the second filter unit through the LNA, and connect another one of the SISO BPFs included in the first filter unit to another one of the Dual Input, Dual Output BPFs included in the second filter unit through the PA. An end of each of the LNA and the PA may be connected to an end of each different SISO BPF included in the first filter unit, and the other two ends of each of the LNA and the PA may be connected to two ends of each different Dual Input, Dual Output BPF included in the second filter unit.

The transmitting/receiving system may further include a relay circuit unit including at least one set of a balun, an LNA, and a PA, the balun having three ends, the LNA having four ends, and the PA having three ends. When a plurality of SISO BPFs is included in the first filter unit and a plurality of Dual Input, Dual Output BPFs is included in the second filter unit, the relay circuit unit may connect one of the SISO BPFs included in the first filter unit to one of the Dual Input, Dual Output BPFs included in the second filter unit through the balun and the LNA, and connect another one of the SISO BPFs included in the first filter unit to another one of the Dual Input, Dual Output BPFs included in the second filter unit through the PA. An end of each of the balun and the PA may be connected to an end of each different SISO BPF included in the first filter unit, the other two ends of the balun may be connected to two ends of the LNA, and the other two ends of each of the LNA and the PA may be connected to two ends of each different Dual Input, Dual Output BPF included in the second filter unit.

The transmitting/receiving system may further include a mixer unit including at least one mixer having four ends. Two ends of the at least one mixer may be connected to two ends of the at least one Dual Input, Dual Output BPF included in the second filter unit.

The at least one SISO BPF may include a Bulk Acoustic Wave Resonator (BAWR) filter.

The at least one Dual Input, Dual Output BPF may include a BAWR filter.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
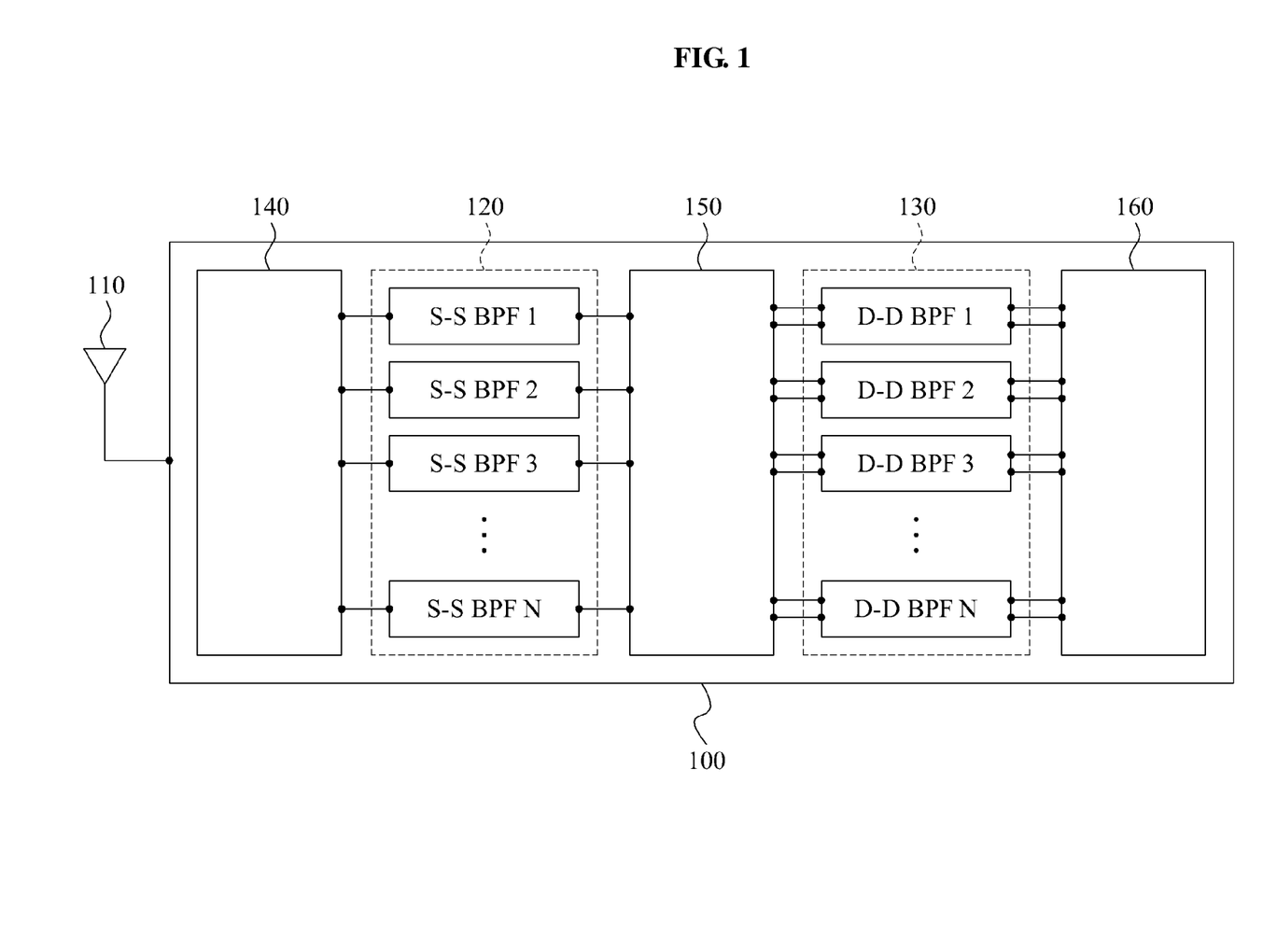
FIG. 1 is a diagram illustrating an example of a transmitting/receiving system.

FIG. 1 illustrates an example of a transmitting/receiving system 100. The transmitting/receiving system 100 includes an antenna end 110, a first filter unit 120, a second filter unit 130, a first circuit unit 140, a relay circuit unit 150, and a second circuit unit 160.

The antenna end 110 may receive/transmit a Radio Frequency (RF) signal from/to an outside. The RF signal may have a multi-band frequency. An analog RF signal may be converted into a digital signal through the first filter unit 120 and the second filter unit 130.

The first filter unit 120 includes at least one Single Input Single Output (SISO) Band Pass Filter (BPF). In FIG. 1, for example, an "S-S BPF 1" through an "S-S BPF N" may indicate a number N of SISO BPFs. In this example, the at least one SISO BPF may include a Bulk Acoustic Wave Resonator (BAWR) filter.

The second filter unit 130 includes at least one Dual Input, Dual Output BPF. In FIG. 1, a "D-D BPF 1" through a "D-D BPF N" may indicate a number N of Dual Input, Dual Output BPFs. In this example, the at least one Dual Input, Dual Output BPF may include a BAWR filter.

In the example shown in FIG. 1, the first circuit unit 140 is a circuit connected to a front end of the at least one SISO BPF. The first circuit unit 140 may transmit the RF signal, received from the antenna end 110, to the first filter unit 120, and the RF signal, received from the first filter unit 120, to the antenna end 110. The first circuit unit 140 is described below with reference to FIG. 2.

The relay circuit unit 150 connects the at least one SISO BPF to the at least one Dual Input, Dual Output BPF. Here, "connect" may indicate an electrical connection among components or circuits, for example. The relay circuit unit 150 may be configured to connect an end of the at least one SISO BPF to two ends of the at least one Dual Input, Dual Output BPF. For example, when the RF signal is received, an output signal, outputted through the at least one SISO BPF, may be inputted in the dual input of the at least one Dual Input, Dual Output BPF through the relay circuit unit 150. For this, the relay circuit unit 150 may include at least one component of a Low Noise Amplifier (LNA), a Power Amplifier (PA), and a balun. Also, the at least one SISO BPF included in the first filter unit 120 and the at least one Dual Input, Dual Output BPF included in the second filter unit 130 may be connected through the at least one component. The relay circuit unit 150 is described below with reference to FIGS. 3 through 7.

In the example shown in FIG. 1, the second circuit unit 160 is a circuit connected to a back end of the at least one Dual Input, Dual Output BPF. The second circuit unit 160 may transmit a signal, filtered through the second filter unit 130, to a circuit processing a digital signal. Also, the second circuit unit 160 may transmit the signal, received through the circuit processing the digital signal, to the second filter unit 130. The second circuit unit 160 is described below with reference to FIG. 8.

Figure 2:
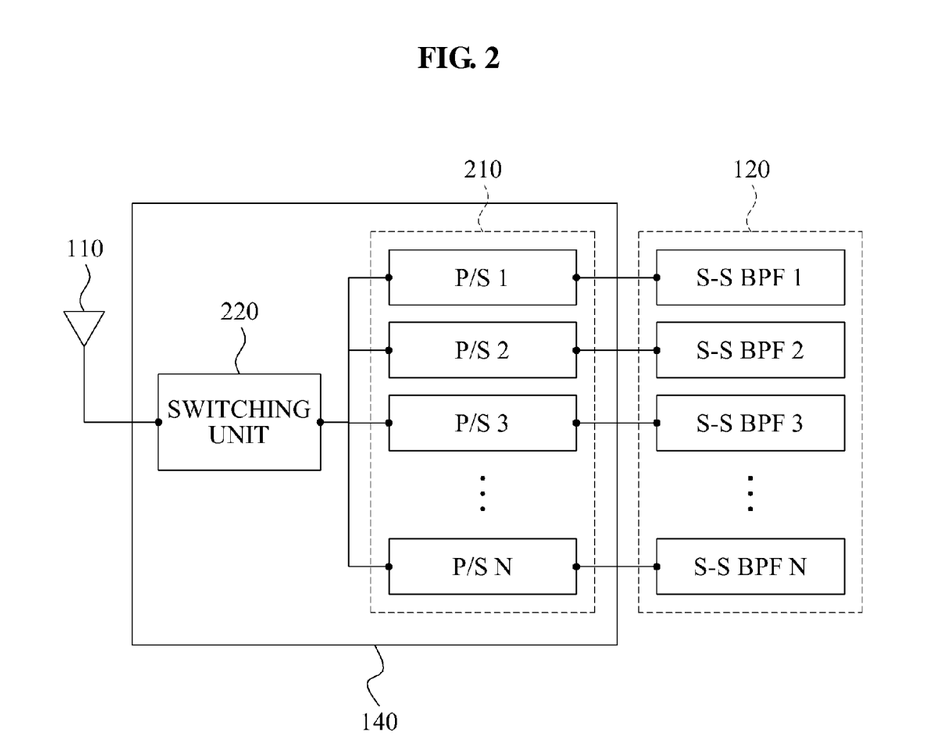
FIG. 2 is a diagram illustrating an example of a configuration of a circuit connected to a front end of a Single Input Single Output (SISO) Band Pass Filter (BPF) in a transmitting/receiving system.

FIG. 2 illustrates an example of a configuration of a circuit connected to a front end of an SISO BPF in a transmitting/receiving system 100. The transmitting/receiving system 100 may further include a phase shift unit 210. The phase shift unit 210 may include at least one Phase Shifter (PS), and be included in the first circuit unit 140. In FIG. 2, for example, a "P/S 1" through a "P/S N" indicates a number N of PSs. In this instance, an end of each of the N PSs may be connected to an end of each of the at least one BPF included in the first filter unit 120. Also, a number of BPFs included in the first filter unit 120, a number of BPFs included in the second filter unit 130, and a number of PSs may be equal to each other. In this instance, when a plurality of PSs exists, the transmitting/receiving system 100 may further include a switching unit 220 that may switch the plurality of PSs. Here, an end of the switching unit 220 may be connected to the antenna end 110. Also, the switching unit 220 may be included in the first circuit unit 140. That is, when an RF signal is received, the switching unit 220 may select a PS among the plurality of PSs to transmit the RF signal to via switching. The RF signal where a phase has been changed through the PS may be transmitted to a BPF, connected to the selected PS, from among the plurality of PSs included in the first filter unit 120.

Figure 3:
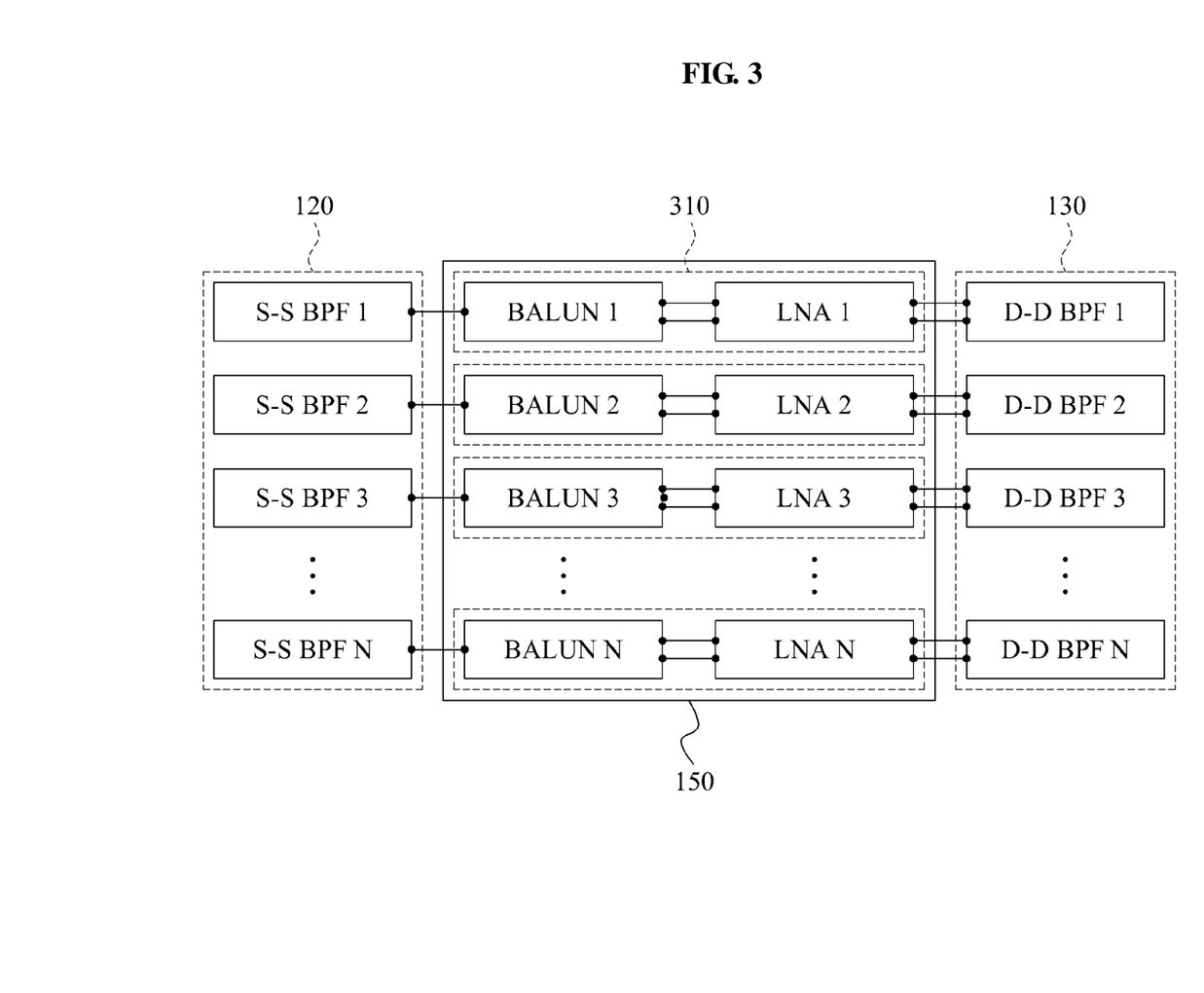
FIG. 3 is a diagram illustrating an example of a configuration of a relay circuit unit connecting an SISO BPF and a Dual Input, Dual Output BPF in a transmitting/receiving system.

FIG. 3 illustrates an example of a configuration of a relay circuit unit 150 connecting an SISO BPF and a Dual Input, Dual Output BPF in a transmitting/receiving system. The relay circuit unit 150 may include at least one set of a balun and an LNA. Here, the balun may have three ends and the LNA may have four ends. The relay circuit unit 150 may include a number N sets of baluns and LNAs as shown by the example in FIG. 3, where each set includes one balun and one LNA. In FIG. 3, a "Balun 1" through a "Balun N" may indicate N baluns, and an "LNA 1" through an "LNA N" may indicate N LNAs. In this instance, the relay circuit unit 150 may connect each of the N BPFs included in the first filter unit 120 to each of the N BPFs included in the second filter unit 130 through each of the N sets of baluns and LNAs. For this, an end of each of the N baluns may be connected to an end of each of the N BPFs included in the first filter unit 120, and the other two ends of each of the N baluns may be connected to two ends of each of the N LNAs. Also, the other two ends of each of the N LNAs may be connected to two ends of each of the N BPFs included in the second filter unit 130. That is, as illustrated in a first dotted box 310, a set of a balun and an LNA may be configured to connect a set of an SISO BPF and a Dual Input, Dual Output BPF.

Figure 4:
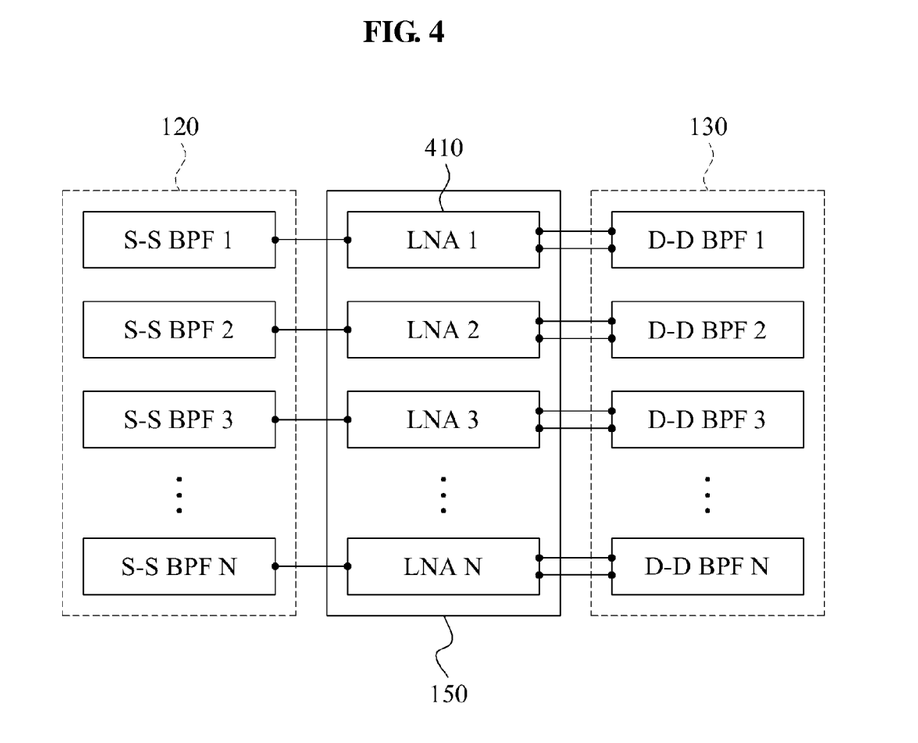
FIG. 4 is a diagram illustrating another example of a configuration of a relay circuit unit connecting an SISO BPF and a Dual Input, Dual Output BPF in a transmitting/receiving system.

FIG. 4 illustrates another example of a configuration of a relay circuit unit connecting an SISO BPF and a Dual Input, Dual Output BPF in a transmitting/receiving system. The relay circuit unit 150 may include at least one LNA having three ends. For example, the relay circuit unit 150 in FIG. 4 may include a number N LNAs. In FIG. 4, a "LNA 1" 410 through a "LNA N" may indicate N LNAs, for example. In this instance, the relay circuit unit 150 may connect each of the N BPFs included in the first filter unit 120 to each of the N BPFs included in the second filter unit 130 through each of the N LNAs. For this, an end of each of the N LNAs may be connected to an end of each of the N BPFs included in the first filter unit 120. The other two ends of each of the N LNAs may be connected to two ends of each of the N BPFs included in the second filter unit 130. For example, an end of the "LNA 1" 410 may be connected to an end of an "S-S BPF 1," and the other two ends of the "LNA 1" 410 may be connected to two ends of a "D-D BPF 1." That is, a single LNA may be used to connect a set of an SISO BPF and a Dual Input, Dual Output BPF.

Figure 5:
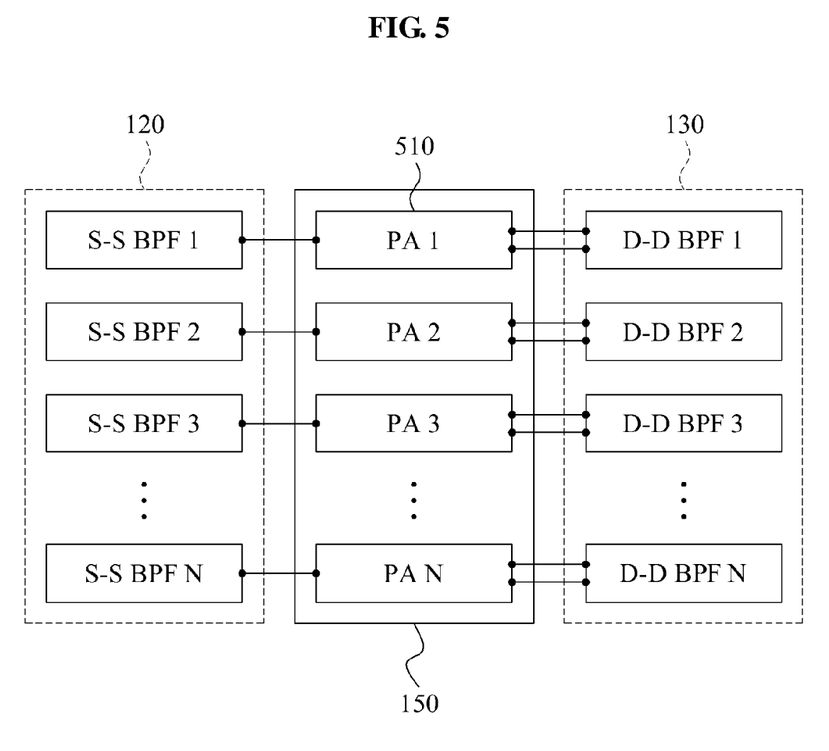
FIG. 5 is a diagram illustrating still another example of a configuration of a relay circuit unit connecting an SISO BPF and a Dual Input, Dual Output BPF in a transmitting/receiving system.

FIG. 5 illustrates still another example of a configuration of a relay circuit unit connecting an SISO BPF and a Dual Input, Dual Output BPF in a transmitting/receiving system. The relay circuit unit 150 may include at least one PA having three ends. For example, the relay circuit unit 150 in FIG. 5 may include a number N PAs. In FIG. 5, a "PA 1" 510 through a "PA N" may indicate N Pas, for example. In this instance, the relay circuit unit 150 may connect each of the N BPFs included in the first filter unit 120 to each of the N BPFs included in the second filter unit 130 through each of the N PAs. For this, an end of each of the N PAs may be connected to an end of each of the N BPFs included in the first filter unit 120. Also, the other two ends of each of the N PAs may be connected to two ends of each of the N BPFs included in the second filter unit 130. For example, an end of the "PA 1" 510 may be connected to an end of an "S-S BPF 1," and the other two ends of the "PA 1" 510 may be connected to two ends of a "D-D BPF 1." That is, a single PA may be used to connect a set of an SISO BPF and a Dual Input, Dual Output BPF.

Figure 6:
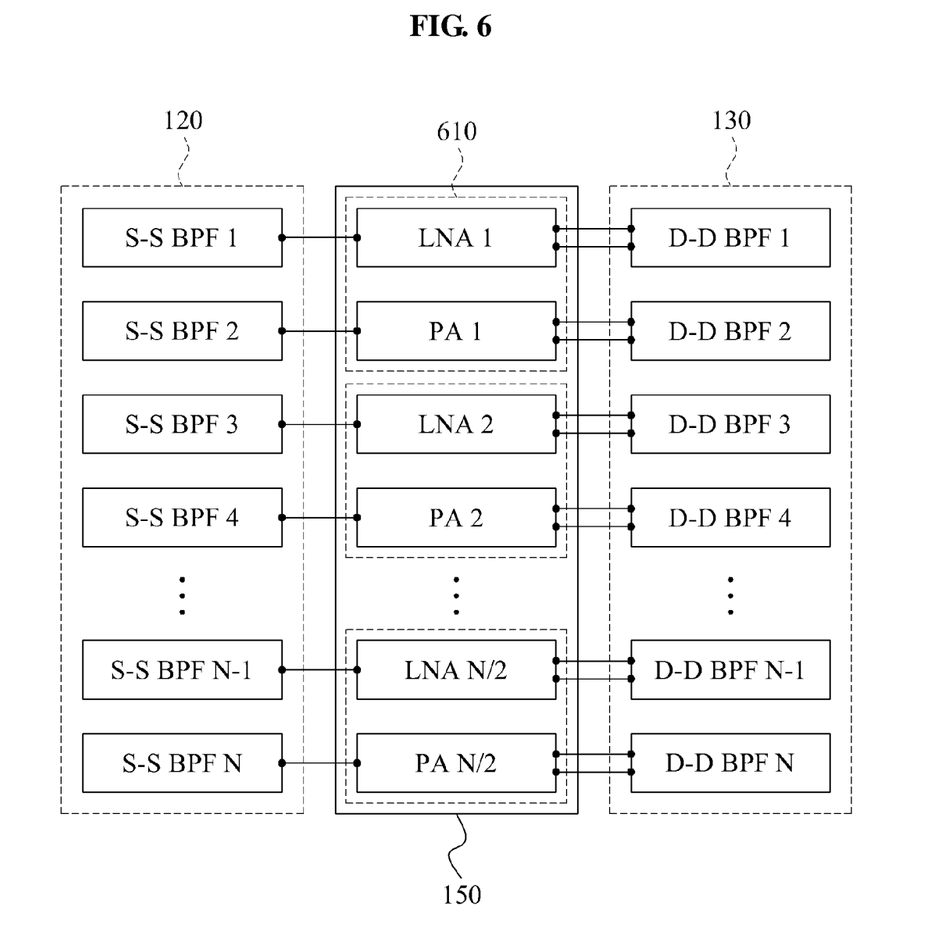
FIG. 6 is a diagram illustrating yet another example of a configuration of a relay circuit unit connecting an SISO BPF and a Dual Input, Dual Output BPF in a transmitting/receiving system.

FIG. 6 illustrates yet another example of a configuration of a relay circuit unit connecting an SISO BPF and a Dual Input, Dual Output BPF in a transmitting/receiving system 100. The relay circuit unit 150 may include at least one set of a PA and an LNA. Here, the LNA may have three ends, and the PA may have three ends. For example, the relay circuit unit 150 in FIG. 6 may include N/2 LNAs and N/2 PAs, where N represents a total number of LNAs and PAs. In FIG. 6, an "LNA 1" through a "LNA N/2" may indicate N/2 LNAs, and a "PA 1" through a "PA N/2" may indicate N/2 Pas, for example. In this instance, the relay circuit unit 150 may connect one of N BPFs included in the first filter unit 120 to one of N BPFs included in the second filter unit 130 through one of the N/2 LNAs. Also, the relay circuit unit 150 may connect another one of the N BPFs included in the first filter unit 120 to another one of the N BPFs included in the second filter unit 130 through one of the N/2 PAs. For this, an end of each of an LNA and a PA from among the N/2 LNAs and N/2 PAs may be connected to an end of each different BPF included in the first filter unit 120. Also, the other two ends of each of the LNA and the PA from among the N/2 LNAs and N/2 PAs may be connected to each different BPF included in the second filter unit 130. For example, an end of the "LNA 1" may be connected to an end of the "S-S BPF 1," and the other two ends of the "LNA 1" may be connected to two ends of the "D-D BPF 1" in a second dotted box 610. Also, an end of the "PA 1" may be connected to an end of the "S-S BPF 2," and the other two ends of the "PA 1" may be connected to two ends of the "D-D BPF 2." That is, a set of an LNA and a PA may be used to connect two SISO BPFs and two Dual Input, Dual Output BPFs.

Figure 7:
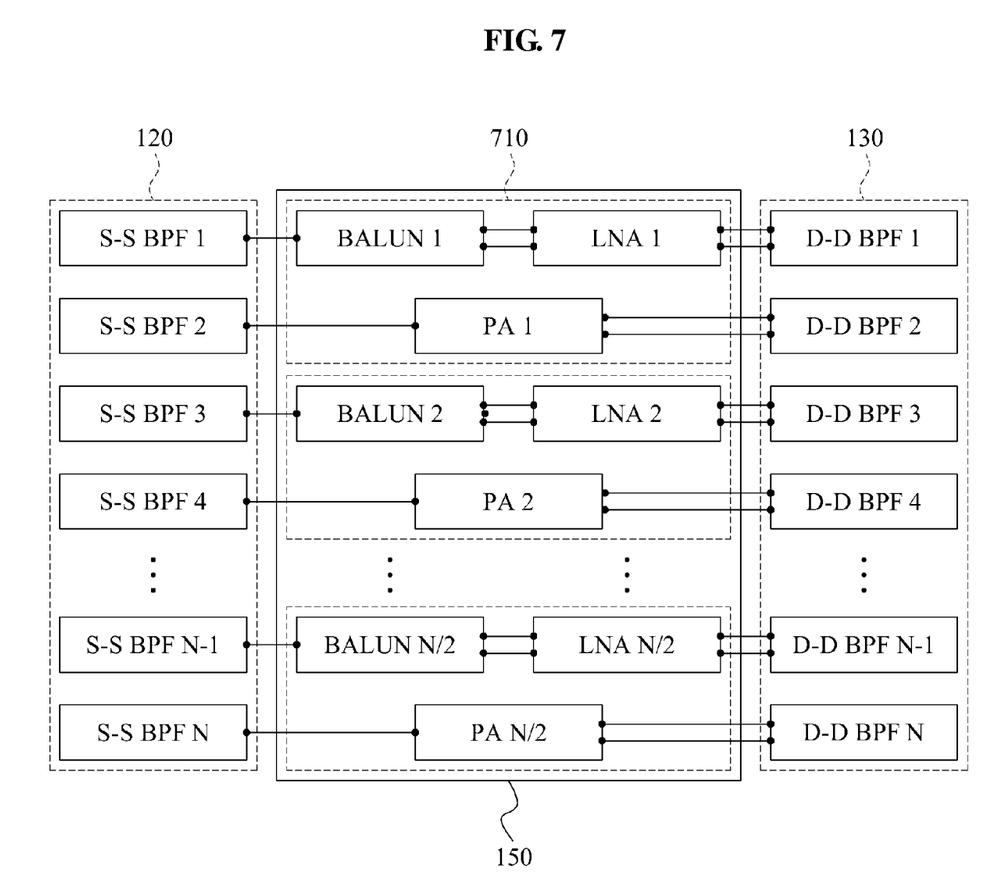
FIG. 7 is a diagram illustrating a further example of a configuration of a relay circuit unit connecting an SISO BPF and a Dual Input, Dual Output BPF in a transmitting/receiving system.

FIG. 7 illustrates a further example of a configuration of a relay circuit unit connecting an SISO BPF and a Dual Input, Dual Output BPF in a transmitting/receiving system.

The relay circuit unit 150 may include at least one set of a balun, a PA and an LNA. Here, the balun may have three ends, the LNA may have four ends, and the PA may have three ends. For example, the relay circuit unit 150 in FIG. 7 may include N/2 baluns, N/2 LNAs, and N/2 PAs, where N represents the total number of LNAs and PAs. In FIG. 7, a "balun 1" through a "balun N/2" may indicate N/2 baluns, a "LNA 1" through a "LNA N/2" may indicate N/2 LNAs, and a "PA 1" through a "PA N/2" may indicate N/2 Pas, for example. In this instance, the relay circuit unit 150 may connect one of N BPFs included in the first filter unit 120 to one of N BPFs included in the second filter unit 130 through one of the N/2 baluns and one of the N/2 LNAs. Also, the relay circuit unit 150 may connect another one of the N BPFs included in the first filter unit 120 to another one of the N BPFs included in the second filter unit 130 through one of the N/2 PAs. For this, an end of each of a balun and a PA from among the N/2 baluns and the N/2 PAs may be connected to an end of each different BPF included in the first filter unit 120. Also, the other two ends of each of the N/2 baluns may be connected to two ends of each of the N/2 LNAs. Also, the other two ends of each of the PA and an LNA from among the N/2 PAs and the N/2 LNAs may be connected to two ends of each different BPF included in the second filter unit 130. For example, an end of the "balun 1" may be connected to an end of the "S-S BPF 1," the other two ends of the "balun 1" may be connected to two ends of the "LNA 1," and the other two ends of the "LNA 1" may be connected to two ends of the "D-D BPF 1" in a third dotted box 710. Also, an end of the "PA 1" may be connected to an end of an "S-S BPF 2," and the other two ends of the "PA 1" may be connected to two ends of a "D-D BPF 2." That is, a set of a balun, an LNA, and a PA may be used to connect two SISO BPFs and two Dual Input, Dual Output BPFs.

Figure 8:
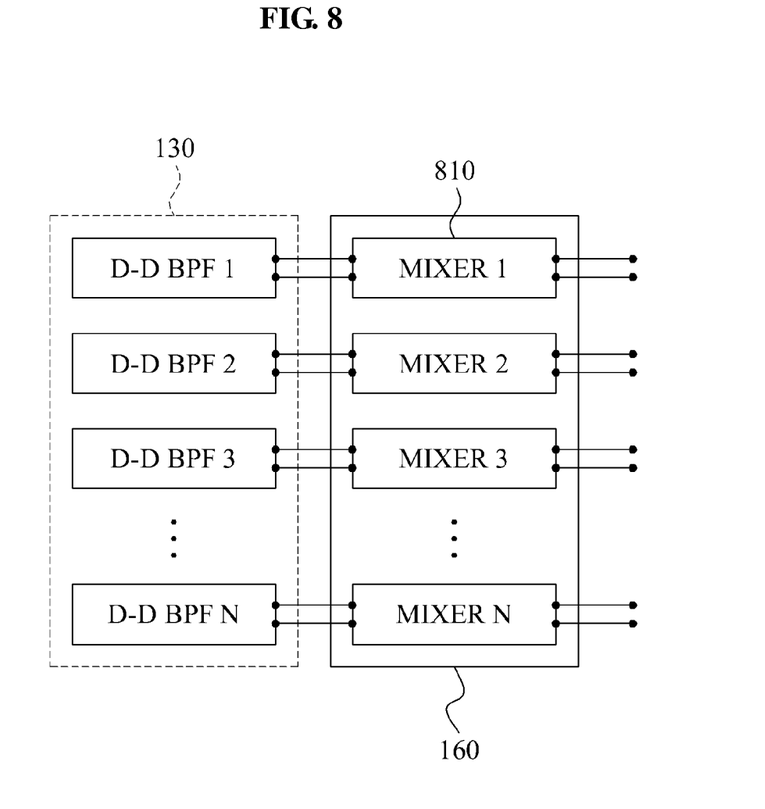
FIG. 8 is a diagram illustrating an example of a configuration of a circuit connected to a back end of a Dual Input, Dual Output BPF in a transmitting/receiving system.

FIG. 8 illustrates an example of a configuration of a circuit connected to a back end of a Dual Input, Dual Output BPF in a transmitting/receiving system. A mixer unit which may be identical to the second circuit unit 160 may include at least one mixer having four ends. For example, a "mixer 1" 810 through a "mixer N" may indicate a number N mixers in FIG. 8. In this instance, two ends of each of the N mixers may be connected to two ends of each of N Dual Input, Dual Output BPFs included in the second filter unit 130. For example, two ends of the "mixer 1" may be connected to two ends of the "D-D BPF 1." The other two ends of the "mixer 1" may be connected to a circuit processing a digital signal.

As described above, according to the transmitting/receiving system, a Dual Input, Dual Output BPF may be arranged in a back end of an analog RF region, and thus a number of components may be reduced, a circuit which is robust against noise and loss may be configured, a size and cost of the circuit may be reduced, and a performance of the circuit may be improved. Also, an RF loss may be reduced by using a BAWR filter as a filter, and a passive component of a front end for multi-band may be configured as a single platform.

According to the above examples, a Dual Input, Dual Output BPF may be arranged in a back end of an analog RF region, and thus a number of components may be reduced, a circuit with less noise and loss may be configured, a size and cost of the circuit may be reduced, and a performance of the circuit may be improved.

Also, according to the above examples, an RF loss may be reduced by using a BAWR filter as a filter.

Also, according to the above examples, a passive component of a front end for multi-band may be configured as a single platform.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmitting/receiving system, comprising:
   a first filter unit comprising a Single-Input Single-Output (SISO) Band-Pass Filter (BPF);
   a second filter unit comprising a Dual Input, Dual Output BPF; and
   a relay circuit configured to connect an output of the SISO BPF to two inputs of the Dual Input, Dual Output BPF,
   wherein the SISO BPF comprises a Bulk Acoustic Wave Resonator (BAWR) filter.

2. The transmitting/receiving system of claim 1, further comprising a phase shift unit comprising a Phase Shifter (PS), an end of the PS being connected to an end of the SISO BPF included in the first filter unit.

3. The transmitting/receiving system of claim 2, further comprising:
   a switching unit configured to switch PSs, in response to PSs existing, an end of the switching unit being connected to an end of an antenna, wherein
   a number of SISO BPFs of the first filter unit, a number of Dual Input, Dual Output BPFs of the second filter unit, and a number of PSs are equal to each other.

4. The transmitting/receiving system of claim 1, the relay circuit unit comprising:
   a component of a Low Noise Amplifier (LNA);
   a Power Amplifier (PA); and
   a balun, wherein the relay circuit unit is configured to connect the SISO BPF included in the first filter unit to the Dual Input, Dual Output BPF included in the second filter unit through the component.

5. The transmitting/receiving system of claim 1, the relay circuit unit comprising a set of a balun and an LNA, the balun having three ends, and the LNA having four ends,
   wherein the relay circuit unit is configured to connect the SISO BPF included in the first filter unit to the Dual Input, Dual Output BPF included in the second filter unit using the set of the balun and the LNA.

6. The transmitting/receiving system of claim 5, wherein:
   an end of the balun is connected to an end of the SISO BPF included in the first filter unit;
   the other two ends of the balun are connected to two ends of the LNA; and
   the other two ends of the LNA are connected to two ends of the Dual Input, Dual Output BPF included in the second filter unit.

7. The transmitting/receiving system of claim 1, the relay circuit unit comprising a LNA having three ends,
   wherein the relay circuit unit is configured to connect the SISO BPF included in the first filter unit to the Dual Input, Dual Output BPF included in the second filter unit through the LNA.

8. The transmitting/receiving system of claim 7, wherein:
   an end of the LNA is connected to an end of the SISO BPF included in the first filter unit; and
   the other two ends of the LNA are connected to two ends of the Dual Input, Dual Output BPF included in the second filter unit.

9. The transmitting/receiving system of claim 1, the relay circuit unit comprising a PA having three ends,
   wherein the relay circuit unit is configured to connect the SISO BPF included in the first filter unit to the Dual Input, Dual Output BPF included in the second filter unit through the PA.

10. The transmitting/receiving system of claim 9, wherein:
    an end of the PA is connected to an end of the SISO BPF included in the first filter unit; and
    the other two ends of the PA are connected to two ends of the Dual Input, Dual Output BPF included in the second filter unit.

11. The transmitting/receiving system of claim 1, the relay circuit unit comprising a set of an LNA and a PA, the LNA having three ends, and the PA having three ends,
    wherein, in response to SISO BPFs being included in the first filter unit and Dual Input, Dual Output BPFs being included in the second filter unit, the relay circuit unit is configured to:
    connect one of the SISO BPFs included in the first filter unit to one of the Dual Input, Dual Output BPFs included in the second filter unit through the LNA, and
    connect another one of the SISO BPFs included in the first filter unit to another one of the Dual Input, Dual Output BPFs included in the second filter unit through the PA.

12. The transmitting/receiving system of claim 11, wherein:
    an end of each of the LNA and the PA is connected to an end of each different SISO BPF included in the first filter unit; and
    the other two ends of each of the LNA and the PA are connected to two ends of each different Dual Input, Dual Output BPF included in the second filter unit.

13. The transmitting/receiving system of claim 1, the relay circuit unit comprising a set of a balun, an LNA, and a PA, the balun having three ends, the LNA having four ends, and the PA having three ends,
  wherein, in response to SISO BPFs being included in the first filter unit and Dual Input, Dual Output BPFs being included in the second filter unit, the relay circuit unit is configured to:
  connect one of the SISO BPFs included in the first filter unit to one of the Dual Input, Dual Output BPFs included in the second filter unit through the balun and the LNA, and
  connect another one of the SISO BPFs included in the first filter unit to a second Dual Input, Dual Output BPF included in the second filter unit through the PA.

14. The transmitting/receiving system of claim 13, wherein:
  an end of each of the balun and the PA is connected to an end of each different SISO BPF included in the first filter unit;
  the other two ends of the balun are connected to two ends of the LNA; and
  the other two ends of each of the LNA and the PA are connected to two ends of each different Dual Input, Dual Output BPF included in the second filter unit.

15. The transmitting/receiving system of claim 1, further comprising:
  a mixer unit comprising a mixer comprising four ends,
  wherein two ends of the mixer are connected to two ends of the Dual Input, Dual Output BPF included in the second filter unit.

16. The transmitting/receiving system of claim 1, wherein the Dual Input, Dual Output BPF comprises a BAWR filter.

17. The transmitting/receiving system of claim 1, wherein the Single-Input Single-Output (SISO) Band-Pass Filter (BPF) consists of one input and one output.

18. The transmitting/receiving system of claim 1, wherein the relay circuit is directly connected to the first filter unit and the second filter unit.

19. A transmitting/receiving system, comprising:
  an antenna;
  a first filter unit comprising a Single-Input Single-Output (SISO) Band-Pass Filter (BPF); and
  a second filter unit comprising a Dual Input, Dual Output BPF,
wherein the first filter unit is between the antenna and the second filter unit and wherein the SISO BPF comprises a Bulk Acoustic Resonator (BAWR) filter.

* * * * *